Dec. 23, 1969  L. E. DUNLAP  3,485,109
BACKLASH BRAKE FOR GEAR DRIVE
Filed June 24, 1968
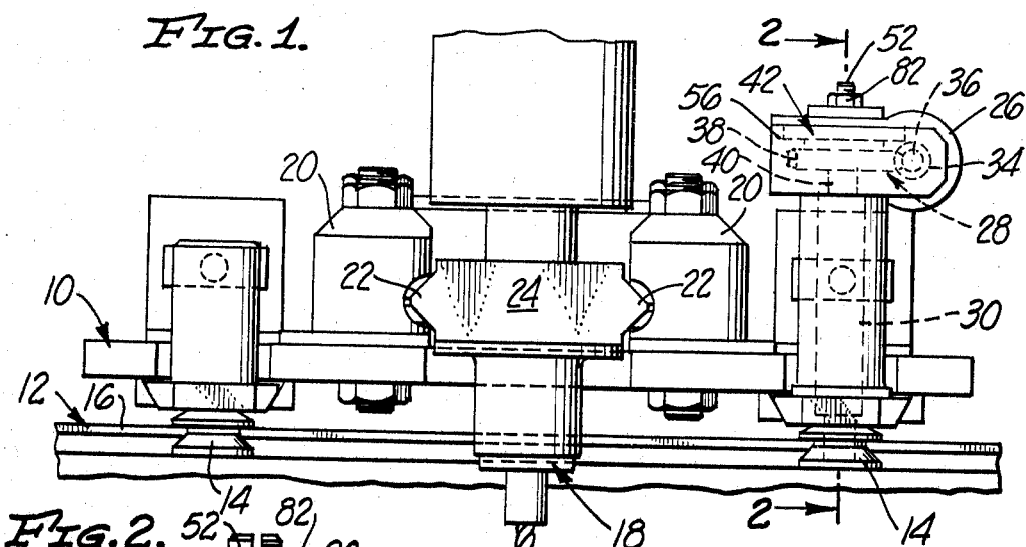
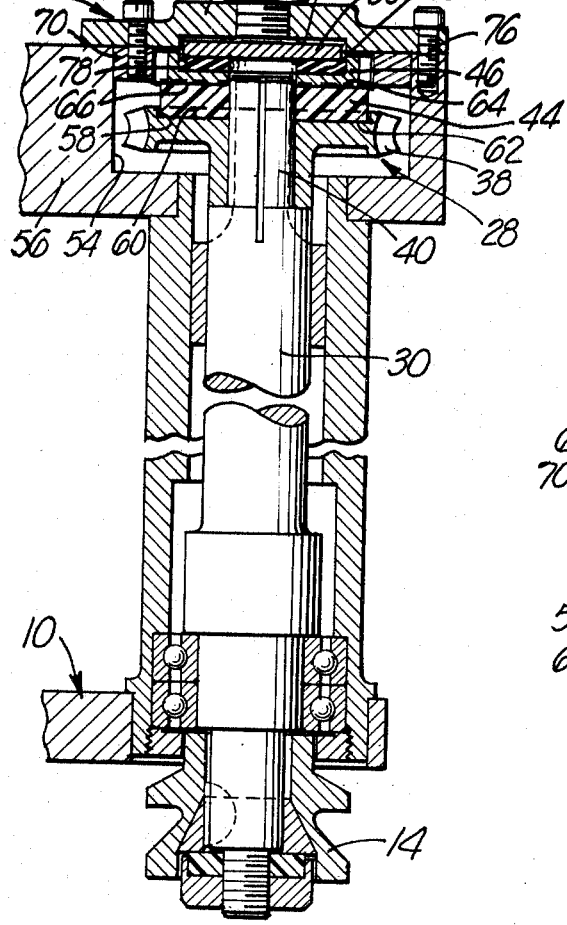
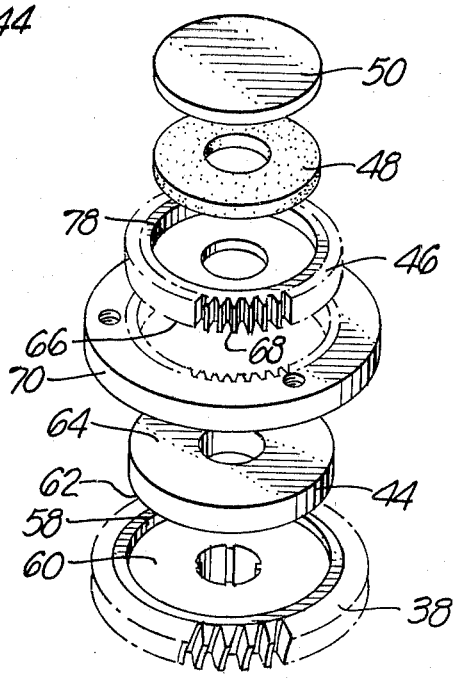
INVENTOR
LAUREL E. DUNLAP
BY
MAHONEY & HORNBAKER
ATTORNEYS United States Patent Office 3,485,109
Patented Dec. 23, 1969

3,485,109
BACKLASH BRAKE FOR GEAR DRIVE
Laurel E. Dunlap, 4510 Mary Ellen Ave.,
Sherman Oaks, Calif. 91403
Filed June 24, 1968, Ser. No. 739,277
Int. Cl. F16h 57/10
U.S. Cl. 74—409                                    12 Claims

ABSTRACT OF THE DISCLOSURE

A driven gear has an axial recess partially receiving a friction plate, the friction plate opposite side being axially engaged by a brake member. The brake member is retained rotatably stationary by tooth engagement with a surrounding mounting member while being urged axially toward said friction plate by a resilient pressure pad received in an axial recess thereof, a pressure plate bearing axially against said pressure pad and an adjustable pressure screw bearing axially against said pressure plate. The arrangement frictionally resists rotation of the driven gear to effectively prevent backlash.

BACKGROUND OF THE INVENTION

This invention relates to a backlash brake for a gear drive and more particularly, to a unique brake assembly arranged actionable against a side surface of a driven gear for frictionally resisting rotation of said driven gear to effectively prevent backlash thereof. Even more particularly, the brake arrangement is such that the friction plate is servicable over a long period of life for accomplishing the intended function thereof.

In the formation of gears for incorportion in gear drives, it is fundamental that, not only must the gear teeth intermesh for transmitting rotational motion therebetween but at the same time, such gear teeth must be freely movable into and from said intermeshing engagement. As a result, it is virtually impossible to provide the engagement between gear teeth of engaging gears without providing some amount of clearance for movement of said teeth into and from such engagement. As soon as clearance is provide between intermeshing gear teeth, however, a further result automatically occurs which is the possible creation of backlash between driving and driven gears.

In many mechanisms including gear drives, backlash between intermeshing gears creates no problems and can be readily tolerated. There are, however, certain mechanisms which require the maximum accuracy of drive and the foregoing backlash can simply not be tolerated if such accuracy is to be obtained. Thus, it becomes a problem as to just how to eliminate such backlash.

OBJECTS AND SUMMARY OF THE INVENTION

It is, therefore, an object of my invention to provide a backlash brake for a gear drive which exerts a constant frictional drag on the driven gear of intermeshing driving and driven gears so as to eliminate backlash in the gear drive despite changing driven loads thereof. In this manner, a steady accurate drive for the driven mechanism is provided despite the fact that there always must be a clearance between the intermeshing teeth of the driving and driven gears for the proper rotating engagement between said gears.

It is a further object of my invention to provide a backlash brake for a gear drive of the foregoing general character which incorporates a unique arrangement of friction plate insuring constant and unform drag on the driven gear, yet serviceable over a long period of useful life. The friction plate is arranged having a side surface frictionally engaging a side surface of the gear, with the opposite side surface of the friction plate frictionally engaging a side surface of a rotationally stationary brake member. Although the brake member is rotationally stationary, said brake member is movable axially toward the driven gear to frictionally sandwich the friction plate therebetween by a unique form of adjustment means insuring the proper axial pressure against the friction plate and the proper maintaining of the frictional drag on the driven gear.

It is still a further object of my invention to provide a backlash brake for a gear drive having all of the foregoing unique and positive features, yet one which requires a minimum of maintenance and adjustment throughout a relatively long serviceable life. The adjustment means for the brake assembly preferably includes a resilient pressure pad bearing axially against the brake member for maintaining the brake member in proper axial relationship with the friction plate and driven gear. A pressure plate bears axially against the resilient pressure pad, which pressure plate is in turn adjusted axially by an externally accessible pressure screw.

Thus, not only does the resilient pressure pad provide relatively uniform and constant axial pressure in the brake assembly and against the friction plate, but the resiliency of said pressure pad reduces the required axial pressure adjustments to a minimum. When such adjustments are required, however, the same may be accomplished readily from exteriorly of the brake assembly in view of the accessibility of the adjustment screw. An even further feature of the brake assembly is that all of the parts thereof are readily accessible by the mere removal of a single cover plate, making complete maintenance thereof relatively easy, even as to the complete replacement of the friction plate after the long period of serviceable life thereof.

Other objects and advantages of the invention will be apparent from the following specification and the accompanying drawing which is for the purpose of illustration only.

BRIEF DESCRIPTION OF THE DRAWINGS

FIG. 1 is a fragmentary, side elevational view of a gear driven mechanism including a gear drive incorporating an embodiment of the backlash brake of the present invention;

FIG. 2 is an enlarged fragmentary, vertical, sectional view looking in the direction of the arrows 2—2 in FIG. 1 and clearly illustrating the assembly of the backlash brake; and FIG. 3 is an exploded view of the backlash brake of FIG. 2.

DESCRIPTION OF THE BEST EMBODIMENT CONTEMPLATED

Referring to FIG. 1 of the drawing, an embodiment of the backlash brake for a gear drive of the present invention is shown incorporated in a particular support mechanism for a template guided tool, said backlash brake being arranged controlling a gear drive of said support mechanism. It should be understood that the particular support mechanism does not form a part of the present invention and is fully disclosed and claimed in my copending application, Ser. No. 739,240, filed June 24, 1968 and entitled "Support Mechanism for Template Guided Tool." Rather, the support mechanism merely is illustrated herein for the purpose of forming an example of one application of the backlash brake of the present invention, so that said support mechanism will only be briefly described herein.

As shown in FIG. 1, the support mechanism includes a carriage, generally indicated at 10, mounted longitudinally movable along a supporting track, generally indicated at 12, by a series of supporting rollers 14, said rollers being arranged for laterally engaging side edges 16 of the supporting track. The carriage 10, in turn, laterally movably supports a motor driven cutting tool, generally indicated at 18, through a series of guide roller assemblies 20 longitudinally engaging side edges 22 of a guide plate 24 upon which the cutting tool 18 is mounted. The cutting tool 18 and its guide plate 24 are normally urged laterally toward the supporting track 12, being template guided in such lateral movement, all by mechanism not shown, so that movement of the carriage 10 along the supporting track 12 carries the cutting tool 18 longitudinally along a template guided cutting path.

More particularly to the mechanism of the present invention, the described longitudinal movement of the carriage 10 along the supporting track 12 is supplied by a drive motor 26 operably connected through a worm gear drive, generally indicated at 28, and a drive shaft, generally indicated at 30, for driving one of the supporting rollers 14, in this case, the supporting roller shown at the right in FIG. 1. Thus, actuation of the drive motor 26 causes rotation of the particular supporting roller 14 to progressively move the carriage 10 along the supporting track 12. Furthermore, in the particular instance illustrated, such longitudinal movement of the carriage 10 must be steady and accurate so that backlash in the gear drive 28 cannot be tolerated.

As hereinbefore stated, the gear drive 28 is a worm gear drive and includes a driving gear 34 mounted on a shaft 36 of the drive motor 26 (FIG. 1), said driving gear being engaged with a driven gear 38 which is spline connected to an upper end 40 of the drive shaft 30, as best seen in FIG. 2. In order to eliminate any backlash in the gear drive 28 between the driving and driven gears 34 and 38 during the transmission of the rotatable drive therethrough, a backlash brake, generally indicated at 42, is operably and uniquely engaged with the driven gear 38 in a manner to be hereinafter described. Generally speaking, however, the function of the backlash brake 42 is to maintain a constant frictional resistance to the rotation of the driven gear 38, thereby preventing the driven gear from overriding the drive of the driving gear 34 and eliminating the possibility of backlash being created therebetween.

Referring particularly to FIGS. 2 and 3, the backlash brake 42 includes a friction plate 44, a brake member 46, a pressure pad 48, a pressure plate 50 and a pressure screw 52. Furthermore, the backlash brake 42 is assembled within a cylindrical cavity 54 of an appropriate frame member 56, said cavity also accommodating the driven gear 38 and the shaft upper end 40. Still further, although the driven gear 38 is in all other respects formed as a standard metal driven gear, in order to provide the necessary engagement with the backlash brake 42, said driven gear is provided with a cylindrical recess 58 opening upwardly and forming a recessed side surface 60 on said driven gear.

The friction plate 44 is hollow cylindrical in configuration, being rotatably received over the shaft upper end 40 and being formed of one of the usual fibrous friction materials. The friction plate 44, therefore, includes generally radially extending upper and lower side friction surfaces 62 and 64, with outer dimensions thereof being slightly smaller than the driven gear recess 58. Thus, the friction plate 44 is partially received downwardly into the driven gear recess 58, with the lower side friction surface 62 of said friction plate engaged with the driven gear recess side surface 60.

The upper side friction surface 64 of the friction plate 44 is engaged with a generally radially extending lower side surface 66 of the brake member 46, said brake member also being hollow, generally cylindrical, but preferably being formed of metal. An outer periphery of the brake member 46 is formed with a series of radially projecting teeth 68 which are interengaged with a surrounding mounting member 70. The mounting member 70 is retained stationary to thereby retain the brake member 46 stationary by a series of screws 72 extending downwardly from a closure 74 over the upper end of the cavity 54, said closure being, in turn, secured to the frame member 56 by a series of screws 76.

An upwardly opening generally cylindrical recess 78 is formed in an upper side of the brake member 46 and receives the pressure pad 48 downwardly therein. The pressure pad 48 is hollow, generally cylindrical in configuration and is formed of one of the usual resilient materials, such as rubber or plastic, and is preferably fully telescoped within the brake member 46. The pressure plate 50 is preferably formed of metal and generally cylindrical in configuration, having slightly smaller outer dimensions than the pressure pad 48 and brake member recess 78, being partially received downwardly within said brake member recess against the pressure pad.

The upwardly projecting portion of the pressure plate 50 is received within a downwardly opening, generally cylindrical recess 80 of the overlying closure 74. Finally, the pressure screw 52 is threadably engaged with the closure 74 extending downwardly therethrough and downwardly against the pressure plate 50. The pressure screw 52 is selectively, threadably adjustable relative to the closure 74 and is retained in any selected adjusted position by a lock nut 82.

Thus, the friction plate 44 is retained axially, frictionally engaged between the driven gear 38 and the brake member 46 by downward axial pressure exerted against the brake member by the combined pressure pad 48, pressure plate 50 and pressure screw 52. The brake member 46 is permitted to move axially from such pressure while being retained rotatably stationary by the brake member teeth 68 engaged with the stationary mounting member 70. A constant frictional resistance to the rotation of the driven gear 38 is, therefore, always provided so as to eliminate the possibility of backlash developing between the driving and driven gears 34 and 38.

It will be particularly noted that, due to the provision of the resilient pressure pad 48, necessary adjustments of the pressure screw 52 will be minimized due to the resilient pressure pad exerting a downward force against the brake member 46 despite slight wear of the friction plate 44, the resiliency of the pressure pad being capable of taking up a certain amount of said wear. At the same time, due to the dual side friction surfaces 62 and 64 of the friction plate 44, the wear on the friction plate will be maintained at a minimum so as to provide the friction plate and the overall backlash brake assembly with a long serviceable life prior to the requirement for any maintenance. When such maintenance is required, however, that is, the replacement of the friction plate 44, such may be accomplished in a minimum amount of time, merely by the removal of the closure 74. Also, when adjustments are required in the pressure screw 52 to take up wear of the friction plate 44, the pressure screw is readily exteriorly accessible so that said adjustments may be accomplished simply and easily.

I claim:

1. In a backlash brake for a gear drive, the combination of: a gear drive including a driving gear operably engaged with a driven gear transmitting rotatable motion therebetween, said driven gear having a generally radially extending side surface; a friction plate having opposite generally radially extending friction surfaces, one of said friction surfaces engaging said driven gear side surface; a brake member having a generally radially extending side surface, the other of said friction plate friction surfaces engaging said brake member side surface; means mounting said brake member rotatably stationary and axially movable relative to said driven gear; and means urging said brake member axially toward said friction plate for creating frictional engagement between said brake member and friction plate and between said friction plate and driven gear to cause said friction plate to frictionally resist rotation of said driven gear.

2. A backlash brake for a gear drive as defined in claim 1 in which said means mounting said brake member rotatably stationary and axially movable includes a series of gear teeth formed on an outer circumferential periphery of said brake member engaged with a surrounding stationary mounting member.

3. A backlash brake for a gear drive as defined in claim 1 in which said means urging said brake member axially toward said friction plate includes a resilient pressure pad.

4. A backlash brake for a gear drive as defined in claim 1 in which said brake member includes an axially inwardly extending recess formed on a side surface thereof opposite from said side surface engaged by said friction plate; and in which said means urging said brake member axially toward said friction plate includes a resilient pressure pad engaged in said brake member recess, a pressure plate axially abutting said pressure pad and a selectively adjustable pressure screw bearing axially against said pressure plate.

5. A backlash brake for a gear drive as defined in claim 1 in which said driven gear side surface has an axially extending recess formed therein providing a part of said side surface within said recess; and in which said friction plate is partially axially received in said driven gear recess.

6. A backlash brake for a gear drive as defined in claim 1 in which a part of said driven gear side surface is axially recessed within said driven gear; in which said friction plate is partially received within said driven gear engaged with said side surface recessed part; in which an outer periphery of said brake member is gear tooth engaged with a surrounding stationary mounting member, said gear tooth engagement retaining said brake member rotatably stationary while permitting axial movement of said brake member relative to said mounting member; in which said brake member includes a recess formed in a generally radially extending side surface thereof opposite from said side surface engaged by said friction plate; and in which said means urging said brake member axially toward said friction plate includes a resilient pressure pad received axially in said brake member recess, a pressure plate axially abutting said pressure pad and a selectively adjustable pressure screw bearing axially against said pressure plate.

7. In a backlash brake and gear assembly, the combination of: a sequentially axially engaged assembly comprising a gear, a friction plate and a brake member; means securing said brake members against rotation while permitting axial movement thereof; and means urging said brake member axially against said friction plate and said friction plate axially against said gear causing said friction plate to create a frictional engagement between said gear and brake member frictionally resisting rotation of said gear.

8. A backlash brake and gear assembly as defined in claim 7 in which said means securing said brake member against rotation while permitting said axial movement thereof includes an operable toothed engagement of an outer periphery of said brake member with a surrounding stationary mounting member.

9. A backlash brake and gear assembly as defined in claim 7 in which said brake member includes an axially inwardly extending recess formed in a side surface thereof axially opposite said friction plate; and in which said means urging said brake member axially against said friction plate includes a resilient pressure pad received in said brake member recess, a pressure plate partially received in said brake member recess and axially abutting said resilient pressure pad, adjustment means operably engaged with said pressure plate and forcing said pressure plate axially against said pressure pad.

10. A backlash brake and gear assembly as defined in claim 7 in which said gear includes an axially inwardly extending recess formed therein at a side axially adjacent said friction plate and partially receiving said friction plate therein.

11. A backlash brake and gear assembly as defined in claim 7 in which said gear is the driven gear of a worm gear drive and has a driving gear engaged therewith.

12. A backlash brake and gear assembly as defined in claim 7 in which said gear includes a recess formed in a side surface thereof and opening axially toward said friction plate, said recess partially receiving said friction plate therein; in which said means securing said brake member against rotation while permitting axial movement thereof includes a series of gear teeth formed on an outer periphery of said brake member, stationary mounting means surrounding said brake member and operably engaged with said brake member gear teeth preventing rotation of said brake member while permitting said axial movement thereof; and in which said means urging said brake member axially against said friction plate includes a resilient pressure pad bearing axially against said brake member, a pressure plate bearing axially against said pressure pad, a selectively adjustable pressure screw bearing axially against said pressure plate.

References Cited

UNITED STATES PATENTS 3,316,772  5/1967  Jones _____ 74—409 X
3,350,952  11/1967  Wostbrock _____ 74—409

LEONARD H. GERIN, Primary Examiner

U.S. Cl. X.R.

74—411.5